United States Patent [19]
Espy

[11] 3,709,446
[45] Jan. 9, 1973

[54] SONIC BOOM REDUCTION

[76] Inventor: Melvin P. Espy, Sunbelt Nursing Home, Route 1, P. O. Box 237, Sequim, Wash. 98382

[22] Filed: May 9, 1969

[21] Appl. No.: 823,465

Related U.S. Application Data

[63] Continuation-in-part of Ser. No. 743,705, July 10, 1968, abandoned.

[52] U.S. Cl. ................................................ 244/1 N
[51] Int. Cl. ........................................... B64c 23/04
[58] Field of Search ............... 244/1, 3, 35.6, 130

[56] References Cited

UNITED STATES PATENTS

| | | | |
|---|---|---|---|
| 3,391,884 | 7/1968 | Carbartt | 244/45 X |
| 2,480,145 | 8/1949 | Jazaras et al. | 244/3 |

OTHER PUBLICATIONS

H. L. Runyan & H. R. Henderson; "Evaluation of Certain Minimum Boom Concepts" published in Proceedings of Second Conference on Sonic Boom Research edited by J. R. Schwartz; NASA SP-180, Washington, D.C., May 9–10, 1968; pp. 47–51.
Moeckel, W. E.; Theoretical Aerodynamic Coefficients of Two-Dimensional Supersonic Biplanes; NACA Technical Note No. 1,316, June 1947.

Primary Examiner—Milton Buchler
Assistant Examiner—Jeffrey L. Forman
Attorney—Cristensen & Sanborn

[57] ABSTRACT

A method of reducing the overpressure imposed on a surface over which a vehicle travels at supersonic speeds by generating an expansion wave of an intensity and at a position whereby the surface contacting portion of the vehicle's shock wave is blended with and reduced by portions of the expansion wave. Apparatus for practicing this method include expandable material filled projectiles which are propelled away from said vehicle and an expansion wave generator in the form of a funnel which is positioned remote from the vehicle body of the wider mouth of the funnel facing in the direction of vehicle travel. The funnel may be structurally attached to the vehicle, towed by the vehicle or self-powered to some extent. Remote controlled and homing type expansion wave generators are also disclosed.

17 Claims, 12 Drawing Figures

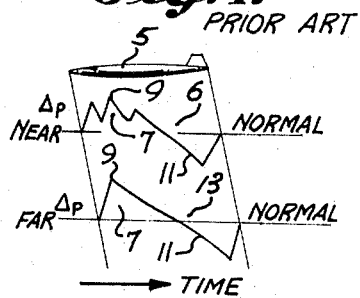
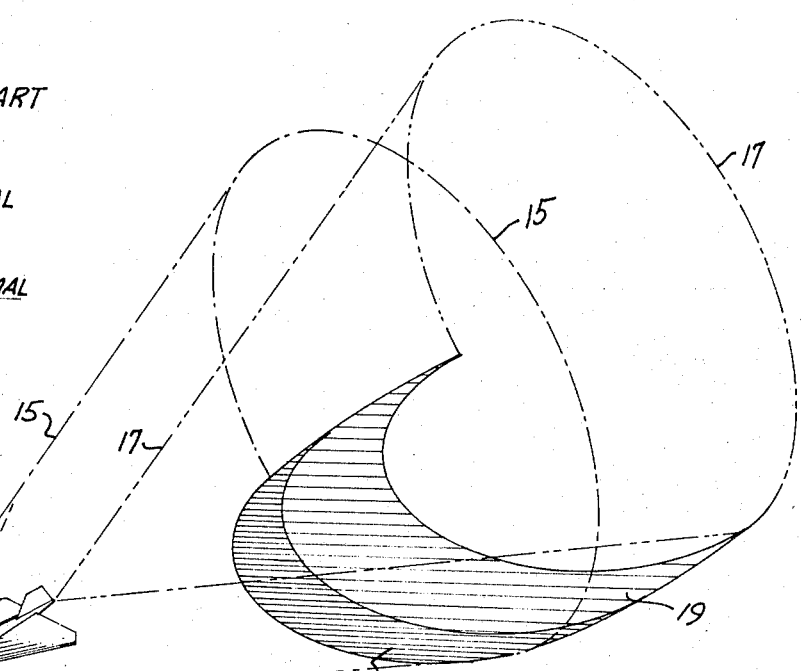
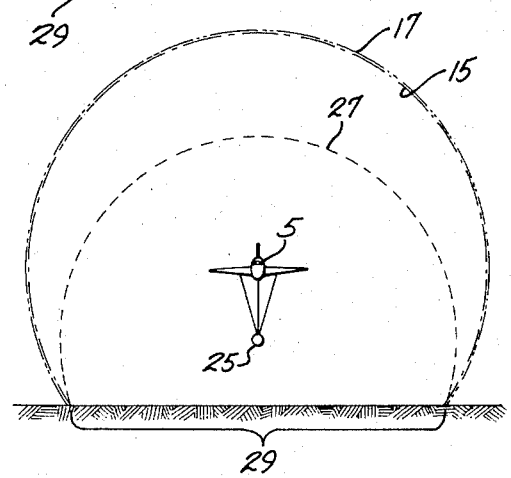
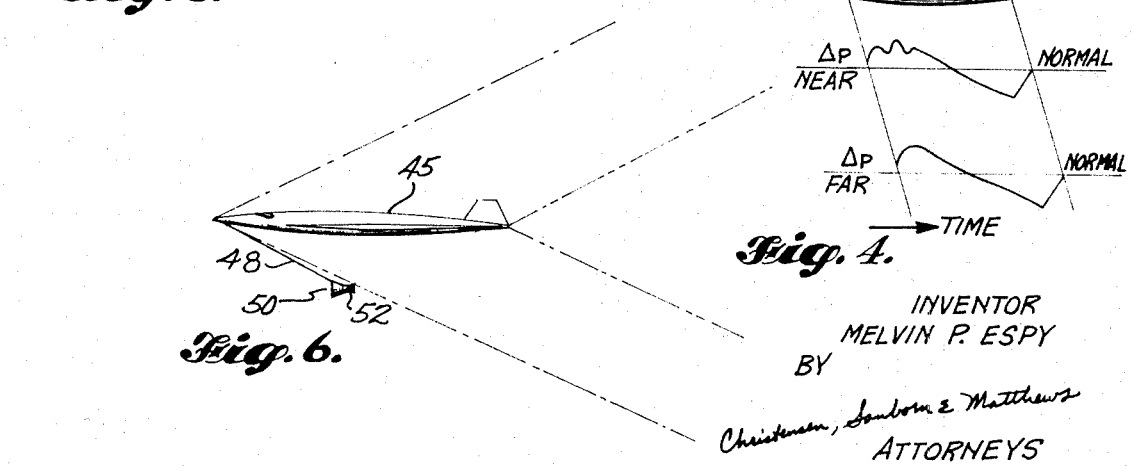
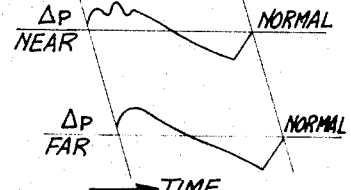

INVENTOR.
MELVIN P. ESPY
BY
Christensen, Sanborn & Matthews
ATTORNEYS

SONIC BOOM REDUCTION

This application is a continuation-in-part of U.S. application Ser. No. 743,705 titled "Sonic Boom Reduction" filed July 10, 1968 now abandoned in the name of the present inventor.

BACKGROUND OF THE INVENTION

1. Field of the Invention

This invention relates to sonic boom reduction and more particularly to methods and apparatus for reducing that portion of the sonic boom shock wave which is imposed on the surface.

2. Description of the Prior Art

As shown in FIG. 2, a sonic boom is generated by an object such as an airplane 5 as it travels at supersonic speeds due to the shock or compression waves generated by the nose, wing and tail of the aircraft. The shock wave is produced in the form of a traveling cone of disturbed air. As the lower portion of the cone strikes the surface it produces overpressures which may have an intolerable effect on humans and some structures if they exceed approximately 2 pounds per square foot over surface atmospheric pressure. As the aircraft flies higher and moves faster, the width of the cone portion as it strikes the earth becomes much larger such that it is very difficult to find a path across the earth where people and sensitive structures are not present. An excellent short explanation of the sonic boom is related in "Mechanical Engineering" January 1967, pages 44 and 45.

Because of the intolerable effects on humans, animals and certain structures due to supersonic aircraft operations, it has been suggested that such aircraft will never be useful for commercial travel other than routes over wasteland areas and large bodies of water. Considerable design effort has been applied to reducing any unnecessary portion of the shock waves generated by supersonic aircraft, an example of this is shown in the U.S. Pat. to Whitcomb No. 2,874,922. As shown, the aircraft configuration is such that reversals of curvature in longitudinal regions of the wing, tail surfaces, canopy, and nacelles are made in order that the generated shock waves of the various portions of the aircraft are reduced.

Still another development in supersonic aircraft design has been disclosed in the Pat. to Rethorst No. 3,314,629. As disclosed, the aircraft design utilizes a configuration for the various components of the aircraft wherein the least amount of obstacle area is presented to the air in the aircraft's path. To accomplish this, the front portion of each component of the aircraft is designed to have an opening of very large dimension such that the air encountered by that portion of the aircraft flows through the opening with very little shock produced by the air deflected to flow around each component.

These and other techniques for reducing the amount of compression or shock waves produced by the vehicle cannot under presently known theories completely eliminate the sonic boom since the vehicle must still have some shock wave generating lift producing structures which will ultimately cause a sonic boom at the surface of the earth even if it has been reduced by optimizing the design of the vehicle itself.

SUMMARY OF THE INVENTION AND OBJECTS

In view of the fact that any vehicle with lift producing surfaces traveling at sonic or higher speeds will generate shock producing compression waves which are referred to as sonic booms when they impose overpressures as they strike the surface over which the vehicle travels, it is a principal object of the instant invention to provide a method which reduces the adverse effects of such vehicle produced shock waves.

It is another object of the instant invention to provide apparatus for generating expansion waves which will blend with the lower portion of supersonic vehicle produced shock waves to thereby reduce the overpressures produced by that portion of the shock wave which comes in contact with the surface over which the vehicle travels.

An additional object of the instant invention is to provide a method of reducing the surface effects generated by supersonic aircraft to thereby permit the use of such aircraft on routes over populated regions.

It is another object of the instant invention to utilize noncontaminating and self-consuming materials in the apparatus for generating expansion waves which will reduce the surface effect of shock waves produced by supersonic vehicles.

A still further object of the instant invention is to provide an apparatus for reducing shock waves produced by supersonic vehicles which apparatus can be used selectively at those locations where untreated shock waves would produce the most intolerable effects.

The principal phenomenon employed in the present invention is an expansion wave used to reduce, negate or partially negate the accumulated or accumulating shock or compression wave generated by the bow, wing and tail portions of a supersonic aircraft.

In accordance with the present invention, a method is provided whereby an expansion wave is generated such that it blends or coalesces with the compression or shock wave produced by a supersonic aircraft in the form of a sonic boom producing cone. This blending takes place in the lower region of the cone which is the region that will ultimately contact the surface over which the supersonic vehicle is traveling. The blending of the expansion wave with the compression wave need not completely cancel the overpressures in the shock wave as long as a sufficient reduction of the overpressures results in that portion of the cone which will ultimately contact the earth since most inhabitants of the earth and structures can tolerate a small amount of overpressures.

Several apparatus are disclosed for generating such an expansion wave including the use of projectiles which are propelled from the vehicle and include within the projectile an expandable material. The trajectory may be selected such that the expansion phase of the material takes place in a region relative to the vehicle such that the vehicle itself partially shields the surface from the effects of any compression or shock wave generated by the material's expansion phase. Once the material has completed its expansion phase, its condensation produces the desired expansion wave, with this phase of the trajectory positioned such that the expansion wave will blend with the lower portion of the compression or shock wave cone produced by the vehicle itself. The projectile may be made of a consumable material such as solid $CO_2$ and the expansion material may be any of a number of inert or other harmless gases which will not contaminate the atmosphere. Another apparatus disclosed for generating the expansion wave is in the form of a funnel-shaped object deployed remote from the body of the vehicle with the larger end of the funnel facing the direction that the vehicle is traveling. This attitude and funnel configuration will generate the expansion waves to blend with the lower portion of the shock waves produced by the vehicle itself. The funnel may be structurally connected to the vehicle, towed by a cable from the vehicle or may be self-powered and remotely controlled as desired. The expansion wave generation apparatus may be produced in the form of a homing type self-powered vehicle which may accompany the major supersonic vehicle as it transits a population center.

These and other features and advantages of the invention will become more clearly apparent from the following detailed description thereof, which is to be read with reference to the accompanying drawings.

BRIEF DESCRIPTION OF THE DRAWINGS

In the drawings:

FIG. 1 is a schematic representation illustrating the prior art generation of a pressure field by an aircraft flying at supersonic speeds;

FIG. 2 is a schematic diagram illustrating the bow and tail shock wave cones generated by a supersonic aircraft as they strike the ground surface and also generally illustrating the first embodiment of the instant invention for reducing the effect of such shock waves at the surface;

FIG. 3 is an end elevation view of the supersonic aircraft of FIG. 2 illustrating the area of shock wave reduction resulting from practicing the instant invention;

FIG. 4 is a schematic illustration similar to FIG. 1 but illustrating the improvement produced by practicing the instant invention;

FIG. 5 is a side elevation view illustrating in schematic form the second embodiment for practicing the instant invention;

FIG. 6 is a side elevation view illustrating in schematic form the third embodiment for practicing the instant invention;

DESCRIPTION OF THE PREFERRED EMBODIMENTS

Figure 7:
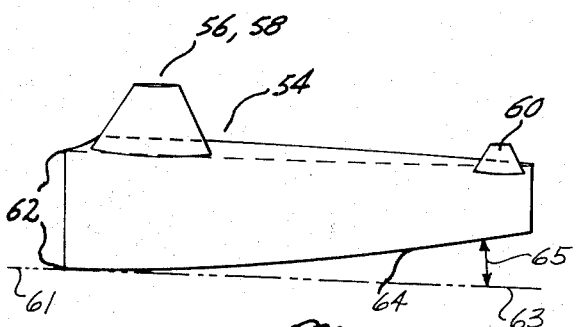
FIG. 7 is a side elevation view showing a fourth embodiment for practicing the instant invention.
Figure 8:
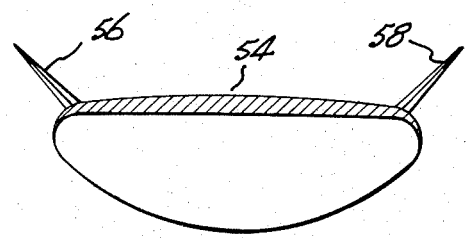
FIG. 8 is a front view of the fourth embodiment for practicing the instant invention.

With general reference to FIGS. 1 to 4, it is noted that a supersonic aircraft 5 will generate conical patterns of disturbed air molecules. The boundary between the undisturbed air region and that disturbed by the aircraft produces an abrupt pressure increase referred to as a shock wave. As shown in FIG. 2, the bow wave cone 15 and tail wave cone 17 are illustrated as they strike the ground producing a pressure signature trace 19.

As shown in FIG. 1, the bow shock cone 15 corresponds to the positive overpressure region 7 and the tail wave cone 17 corresponds to the upwardly directed shock wave existing in the negative pressure region 11. The sound from these pressure changes, when heard by inhabitants on the surface of the earth, is referred to as the sonic boom. The overpressures caused by the supersonic aircraft tend to coalesce or otherwise become blended as the distance between the aircraft and the disturbed air increases with time. Initially there occurs what is referred to as the near field region, illustrated as near field wave 6, where the individual peaks of overpressure corresponding to the various shock wave portions of the aircraft configuration are still detectable and the far field region, shown by the far field wave 13, where a more characteristic smooth N wave form is sensed. In the far field wave form, such as illustrated in FIG. 2, inhabitants of the earth beneath the path of the aircraft will sense two rather sharp pressure extremes which are caused by the disturbance generated by the bow and tail structures of the aircraft.

The reason that there is a positive pressure region is that in this portion of the aircraft configuration there is an increased cross-sectional area of the aircraft structure causing disturbance of the air through which it travels. As the fuselage becomes tapered to the rear end of the aircraft, a lesser amount of air is disturbed by the movement of the aircraft and this causes the negative pressure region. Since it is believed that a portion of the extent of the negative peak pressure is due to the elastic response of the disturbed air in a wave-like phenomenon, the principal target for the instant invention is the positive pressure region and more particularly toward its reduction.

To be more specific, reference is now directed to FIG. 2 wherein the first embodiment expansion wave generator 25 is shown as being positioned remote from the body of the aircraft 5 through structural supports 26. Just as in the case of the aircraft 5 itself, which generates bow wave cone 15 and tail wave cone 17, expansion wave generator 25 generates an expansion wave cone 27 which is preferably directed toward the lower region of the aircraft's bow and tail wave cones 15 and 17. In this blending area, referred to as the coalescence region 29 shown in FIG. 3, the overpressures generated by the aircraft 5 can be reduced by the expansion wave cone 27. This reduction will permit the operation of the supersonic aircraft in regions where previous operations of the same speeds by same type of aircraft would be impossible due to the intolerable overpressures generated. It also makes possible the increase of aircraft size or speed which would ordinarily bring an additional amount of overpressure which would be otherwise intolerable to the inhabitants of the ground area over which the aircraft flew.

As shown in FIG. 4, the general effect of the use of expansion wave generator 25 is to reduce the peaks of overpressure produced at the ground level by the supersonic aircraft 5. The near field condition is shown reduced by expansion wave generation 25 which will permit the aircraft to reach supersonic speeds early in its initial takeoff stages and will permit it to make more of its landing approaches at supersonic speeds. The overall reduction of the far field overpressure condition will permit the aircraft to travel over regions which previously were not available due to the intolerable effect of untreated overpressures produced. Basically, it is seen that by generation of an expansion wave of a size and in a position which will interfere with the lower portion of the shock waves generated by the supersonic aircraft, it is possible to effect a reduction in the overpressures generated by such aircraft.

The first embodiment expansion wave generator 25 shown in FIGS. 2 and 3 may have a form as simple as that of a funnel with its larger end positioned in the direction that the aircraft is traveling. Although it is recognized that a certain amount of shock wave may be developed by the interface between the lip of the generator 25 and the adjacent air, a good portion of the shock wave is actually swallowed within the funnel generator 25. The expansion wave, however, generated by the external collapsing configuration of generator 25 is significantly larger to the point where it will have a significant effect on the pressure signature trace 19 of the aircraft 5. The exact hardware configuration of the structural supports 26 is not considered critical at this point in the development of the expansion wave generation system but such structures may include the capability of remotely positioning the generator 25 such that it may be positioned above, ahead, below or even aft of the supersonic aircraft 5. With this capability of positioning expansion wave generator 25, it is possible to accommodate the various modes of operation of the aircraft, such as takeoff, level flight and landing. Structurally the generator design may permit the use of an expandable configuration which may be reduced for possibly nesting the generator into the aircraft itself for storage during transoceanic and other untreated portions of travel of aircraft 5.

The significance of the shock wave reduction afforded by the expansion generation concept of the instant invention becomes more clear with reference to a present understanding of current designs of commercial supersonic aircraft. A Mach 2 aircraft, that is one designed to travel at twice the speed of sound, having a gross weight of 250,000 pounds and designed to operate at altitudes between 25,000 to 45,000 feet, will produce a peak overpressure 9 such as illustrated in FIG. 1 of from 2.0 to 2.5 pounds per square foot over ambient pressure with the lowest negative of approximately 2.0 pounds per square foot below normal atmospheric pressure. The time lapse for the sonic boom is from 0.15 to 0.25 seconds in duration. This means that approximately this amount of time spans between the first sensation of the bow wave cone boom to the completion of the sensation of the tail wave cone boom. In general, it has been found that most people, some animals and some buildings when exposed to such peak overpressures are adversely affected to a point of intolerance. The United States Federal Aviation Administration has determined at this time that a tolerable overpressure in a general situation is 1.5 pounds per square foot. It is therefore toward the reduction of the overpressures from something above 1.5 pounds per square foot to 1.5 pounds per square foot or less, that is the general objective of the expansion generation system of the instant invention. It is therefore seen that such a reduction to the overpressure is indeed significant when it makes possible the overland flights of supersonic aircraft at speeds and at altitudes which otherwise would produce intolerable overpressures.

With reference to FIG. 5, the second embodiment for an expansion wave generation system is illustrated. Supersonic aircraft 35 includes means for propelling or projecting a series of projectiles 38 which contain an expandable material useful in the generation of expansion waves. The expandable material goes through two phases of operation, the first phase or expansion phase produces shock waves or compression waves as the expandable material takes on a larger profile as it is projected away from aircraft 35. The second phase or condensation phase, is the useful one for the purposes of this invention wherein the expandable material having reached its maximum expansion begins to condense and presents a collapsing profile against the air. This collapsing profile causes the generation of an expansion wave which is of sufficient magnitude and path to blend with the lower portion of the shock wave generated by the aircraft itself. In this way the ground sensed shock wave is reduced to the extent that the expansion wave blends in with and coalesces with it. As shown in FIG. 5, the trajectory of the projectiles 38 is such that during the initial expansion phase when a shock wave is produced by the expanding material, the projectile is in flight ahead and above aircraft 35. In this way the aircraft and the disturbed air flow adjacent to it acts as a partial shield against the shock wave generated by projectiles 38 as they expand so that such waves do not significantly add to the shock wave generated by the supersonic aircraft itself. A great variety of other trajectories are available with launchings in any direction and at a wide range of velocities.

In order that the generation of the expanding material does not add to the contamination of the atmosphere, it is possible to use inert or otherwise harmless materials such as carbon dioxide, nitrogen or liquid hydrogen as the expanding materials. The shell or container for the expandable materials may also be made of a self-consuming noncontaminating material such as $CO_2$ in dry ice form. The particular system for projecting the projectiles 38 from the aircraft 35 may be quite varied depending upon the number, size and shape of the projectiles and the duration of the firing. The ejectors themselves may be mounted in the fuselage or wing structures of the aircraft and the projectiles may be propelled by means of a recoilless launcher, rockets and springs, or pneumatic or hydraulic catapult systems could be used. Such projectiles could be fired from a multiplicity of barreled ejectors which would permit loading of one barrel with one projectile while another is shooting off another projectile.

Another technique, beyond use of the aircraft itself as a shield against the initial shock waves produced by the projectile, is to direct the trajectory at a high upward rate of climb such that the shock wave generated will be directed basically on an upward path and will not become combined with the shock wave generated by the aircraft itself. It is also possible to project the projectiles downwardly or off to the side from the aircraft or to eject a steady stream of expandable material from the aircraft as long as the generated expansion wave is of the size and in a possible suitable for interfering with the ground directed portion of the shock wave generated by aircraft 35.

A third embodiment of an expansion generator is shown with reference to FIG. 6 wherein supersonic aircraft 45 is shown in flight and accompanied by the third embodiment expansion wave generator 50. The generator 50 may be deployed from aircraft 45 by a suspension system comprising cable 48 in a location suitable for directing its expansion wave into the lower quadrant of the shock wave generated by aircraft 45. In order that the drag produced by the expansion wave generator 50 does not significantly add to the power requirements of aircraft 45, it is possible to mount a prime mover in the form of engine 52 within generator 50. Engine 52 may be of several types such as ramjets, turbojets or pulse jets, each of sufficient power to partially relieve suspension system 48 from the drag caused by the generator 50 or completely power generator 50 such that it can be remotely controlled and thereby completely severed from any actual connection with aircraft 45.

In design, generator 50 is substantially equivalent to the configuration of the first embodiment generator 25 in that it presents a funnel-like shape with the large end of the funnel facing the direction toward which aircraft 45 is traveling. The diffuser end of the generator 50 can have a variable diameter for forming the funnel lip structure thus providing a reduction to size useful for changing the characteristics of the expansion wave generated and for permitting easy storage of generator 50 within the structure of aircraft 45. By referring to the funnel shape it is intended not to be limited but rather to include any structures having a decreasing size profile from front to back to thus generate an expansion wave suitable for blending with, coalescing and reducing the shock wave generated by supersonic aircraft 45. The shock waves generated by the expansion wave generator 50 can be minimized through the use of the design features of the aforementioned patent to Rethorst. Other design techniques can be used to direct unavoidable shock waves away from the sensitive surface areas.

In view of the function to be provided by the expansion wave generator, it is possible to use a manned or remotely controlled escort aircraft which would be directed to accompany a supersonic aircraft as it transits a population center to thereby generate an expansion wave of suitable characteristics for reducing the shock wave otherwise produced by such vehicle. Such an aircraft escort service would substantially reduce the difficulties involved with carrying, deploying and controlling the expansion wave generator from the aircraft itself. The expansion wave generation capabilities of such an escort aircraft could be of rather broad range to accommodate the various sizes, speeds, and other operating characteristics of the supersonic aircraft that might be utilizing such a service.

A more specific embodiment of a remote controlled generator 50 is shown in FIGS. 7 through 12. FIG. 7 shows a ramjet 54 having small wings 56 and 58 each disposed at approximately a 45° angle to the horizontal. The wings 56 and 58 are attached to the upper surface of the ramjet shell. FIG. 7 shows the pronounced negative rake in the lower surface 64 of the ramjet. Negative rake, as used herein, is defined as the angle from the horizontal (i.e. relative undisturbed airstream) which the exposed surface (usually the under surface) of an aircraft makes with the aircraft in level flight. This angle is usually measured from the nose of the craft as is shown in FIG. 7. The bottom 64 of the craft 54 is spaced at a negative rake angle 65 from the horizontal datum line 61–63. Additional control and lift surfaces 60 may be included in rear portion of the upper surface of the ramjet shell if desired. The leading edge 62 of the ramjet shell is a knife edge to minimize generation of a shock wave which would be radiated downwardly. The entire under surface of the ramjet is constructed so that a negative rake extending from the leading edge back is present at all times during the operational phases of flight with respect to undisturbed airflow.

Due to the pronounced negative rake along the lower rear portions of the ramjet engine it will be seen that an expansion wave will be generated. The ramjet engine will be flown in proper relationship to the main aircraft so that the expansion wave radiating downwardly from the ramjet will combine or coalesce with the shock wave of the main aircraft and hence cause cancellation of all or a major portion of the shock wave. This arrangement is in distinct contrast to conventional craft which have a positive rake from the leading edge aft along the lower surface and hence generate compression waves which radiate downwardly.

Figure 9:
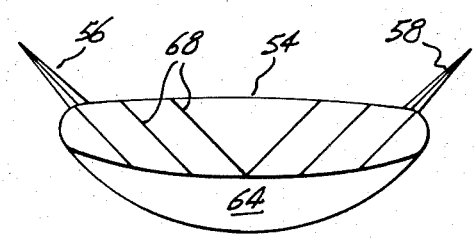
FIG. 9 is a rear view of the fourth embodiment for practicing the instant invention.

Part of the concept involved in the engine illustrated is that the interior aerodynamics of the engine itself will provide a portion of the lift necessary to keep the engine airborne. It is believed that any shock waves generated by the lift induced due to the interior aerodynamics of the engine will be effectively destroyed in the interior of the engine. The expansion wave directed in a downwardly direction due to negative rake on the lower side of the ramjet thus will be the predominant effect. FIG. 9 is a view of the rear portion of the ramjet 54 showing the deflection blades 68 which are used to deflect exhaust gases outwardly from the ramjet to minimize any downwardly directed compression effects which may be associated with the exhaust gases. The direction of the deflection blades causes the exhaust gases to be radiated out and down from the axis of the ramjet at an angle adequate to substantially eliminate compression effects directed to the ground below.

Figure 10:
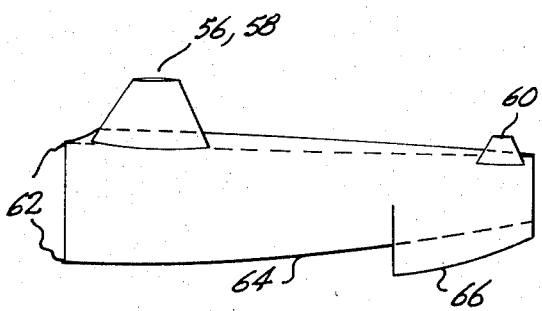
FIG. 10 is a side elevation view showing a fifth embodiment for practicing the instant invention.

FIG. 10 shows a ramjet having an adjustable scoop surface 66 attached to the bottom side of the ramjet. This adjustable scoop surface 66 is designed to generate a negative pressure region to create an expansion wave which is radiated downwardly. The adjustable scoop surface 66 may be controlled by any of several control modes including operation by the pilot of the supersonic craft or by a ground station through remote controls or by onboard automatic controls. The onboard automatic control would utilize inputs including velocity, atmospheric conditions, distance from the supersonic craft, and others to determine the proper setting for the adjustable scoop 66 to optimize the sonic boom reduction.

Figure 11:
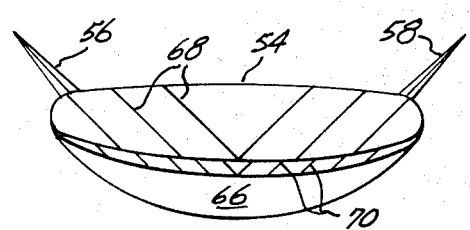
FIG. 11 is a rear view of the fifth embodiment for practicing the instant invention.
Figure 12:
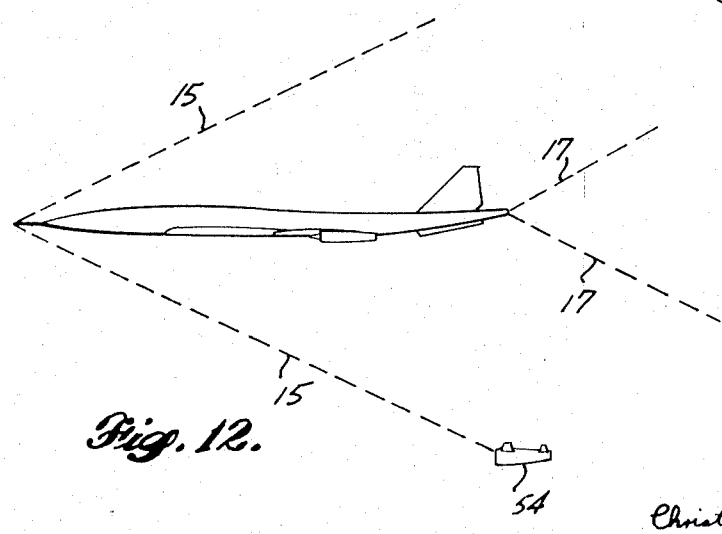
FIG. 12 is a side elevation view illustrating in schematic form the fourth and fifth embodiments for practicing the instant invention.

In FIG. 11, which is a rear view of the embodiment shown in FIG. 10, deflector blades 70 are shown which tend to deflect gases passing through scoop surface 66 in an outward and downward direction to prevent generation of a downwardly directed compression wave. Thus it will be seen that the exhaust gases and air passing through the engine and through the scoop 66 do not generate a downwardly directed compression wave. Each of the deflector blades 68 will lie in a plane which is tilted at an angle of approximately 45° to the horizontal in level flight and at an angle of approximately 45° with the vertical axis of the aircraft. The orientation of the deflector blades causes the exhaust gases to be deflected outwardly and downwardly to minimize any downwardly directed shock wave while providing lift for the craft. Of course, the deflector blades could be constructed to permit change of the angle with respect to the airstream or exhaust gas stream in response to commands from the ground or from the supersonic aircraft as well as variable roll and pitch control to aid in navigating the ramjet.

The lower scoop 66 illustrated in FIGS. 10 and 11 would have a radius of curvature on its under side corresponding to a portion of a large circle and be related to the diameter of the supersonic aircraft. The actual dimensions of the new ramjet vehicle will depend upon the physical configuration and characteristics of the supersonic aircraft for which the device is being designed.

For control and flight of the pilotless embodiment of the ramjet and small wings 56 and 58 and the control and lift surfaces 13 would be individually controllable in attitude about an axis along their longitudinal center lines. This control might be applied in unison to increase or decrease lift or differentially to provide stability in roll and pitch and to provide the necessary maneuverability required for use of the ramjet device in conjunction with a supersonic aircraft. The operation and control of the movable surfaces on the ramjet may of course be accomplished through techniques well known in the art.

The ramjet principles illustrated in the attached drawings and discussed above may be embodied in a radio-controlled, pilotless craft to be flown from a land installation out to meet an incoming supersonic craft approaching the land mass. The aircraft itself would then assume control of the radio-controlled plane, and position it in relation to the supersonic transport. It is also contemplated, however, that the ramjet principles outlined above could be used in a manned aircraft embodiment. Furthermore, either the pilotless or piloted craft discussed above could, of course, be stowed and transported within or as a part of the airframe of the supersonic aircraft. The companion craft could easily be lowered, or paid out rearwardly, on a cable from the supersonic craft in flight and released to fly in concert with the supersonic craft over inhabited regions, then returned to its stowage place on the supersonic aircraft when not needed.

It is therefore seen from the foregoing that by utilization of an expansion wave generation system it is possible to reduce the surface effects of supersonic aircraft. The use of the expansion wave generation system provides some distinct and desired advantages to those operating supersonic aircraft and those within the vicinity where such aircraft are operating. These advantages include the ability for the aircraft to fly at supersonic speeds over territory having a sensitive population by reducing the overpressures caused by such travel to a tolerable level. In addition, this system provides the ability for the supersonic aircraft operator to fly at lower altitudes, at higher speeds such as for takeoff or making approaches for landing than is possible when the resulting shock wave is not reduced.

It must be recognized that a wide variety of conditions can attend generation of undesirable boom phenomenon in the form of overpressures and that the expansion wave generation system of the instant invention has a broad range of flexibility as to its location and intensity to cope with such a range of conditions. Even if all the testing and development of this system had been completed for all ranges of speeds, elevations, weather, sizes of aircraft and other conditions, it would not be possible at this time to pinpoint the specific means of generation or the details of employment of same to produce the ideal or most practical results. The nature of the system and specific means proposed herein is such that very significant variation in both makeup and details of employment are easily accomplished by those skilled in the art. Accordingly, experimentation using such techniques and the basic principles herein disclosed by those skilled in the art can be readily used to establish the most useful and practical detailed apparatus design and utilization technique for any specific range of operation of specific supersonic aircraft.

I claim:

1. A method of reducing the ground effects of a vehicle traveling above the ground at supersonic speeds comprising:
    generating an expansion wave ahead of the main resultant shock wave generated by said vehicle and;
    utilizing said expansion wave to coalesce with and reduce the overpressure of the lower portion of said shock wave thereby reducing the overpressure at the ground surface caused by said vehicle.

2. The method of claim 1 wherein:
    said expansion wave is generated by positioning remote from the main body of said vehicle at least one funnel-shaped object with its larger end facing the direction in which the vehicle and funnel object are traveling so that the expansion wave is developed along the outside surface of said object.

3. The method of claim 2 wherein:
    said funnel object is towed by said vehicle.

4. The method of claim 2 including:
    providing a prime mover in said funnel object so that it is at least partially self-propelled.

5. The method of claim 4 wherein:
    said prime mover is a ramjet engine.

6. The method of claim 2 wherein
    said funnel-shaped object comprises a companion craft having a prime mover therein and having a decreasing cross section from front to back to prevent propagation of a shock wave while generating said expansion wave.

7. The method of claim 6 wherein
    said companion craft has a negative rake on its under side with respect to the airstream to provide an expansion wave phenomena at supersonic speeds.

8. Apparatus for reducing the ground surface effect of an airborne vehicle traveling at supersonic speed comprising:
   means for generating an expansion wave, said means traveling at a speed substantially equal to said airborne vehicle;
   means for positioning said means for generating an expansion wave nearby said vehicle at a location ahead of the main resultant shock wave generated by said vehicle so that said expansion wave will move back to and blend with said shock wave thereby reducing the overpressure of at least a portion of said shock wave generated by said vehicle.

9. The apparatus of claim 8 wherein:
   said generating means has an exterior form of decreasing cross section from front to back.

10. The apparatus of claim 9 wherein:
    said positioning means includes a suspension system connected at one end to said generation means and at the other end to said vehicle.

11. The apparatus of claim 9 wherein
    said generating means has a forward end variable in size.

12. The apparatus of claim 9 wherein
    said generating means includes a prime mover for overcoming air resistance.

13. The apparatus of claim 9 wherein:
    said means for generating an expansion wave comprises at least one companion craft to said vehicle traveling at a velocity substantially equal to that of said vehicle.

14. The apparatus of claim 13 wherein:
    said companion craft has a pronounced negative rake to the under side of said companion craft with regard to the horizontal axis of said companion craft in level flight.

15. The apparatus of claim 13 having means to suppress or substantially eliminate downwardly directed compression waves from said companion craft.

16. The apparatus of claim 15 wherein
    said means to suppress comprises knife-like leading edges and side directed exhaust deflector means on said companion craft.

17. The apparatus of claim 9 wherein said generating means is in the form of a funnel with the larger end thereof facing the direction of travel of said vehicle.

* * * * *